(12) United States Patent
Kim et al.

(10) Patent No.: US 12,738,419 B2
(45) Date of Patent: Sep. 15, 2026

(54) MULTILAYER CERAMIC CAPACITOR AND METHOD OF MANUFACTURING THE SAME

(71) Applicant: SAMSUNG ELECTRO-MECHANICS CO., LTD., Suwon-si (KR)

(72) Inventors: Tae Hyung Kim, Suwon-si (KR); Nam Woon Kim, Suwon-si (KR); Hyoju Lee, Suwon-si (KR); Sanghyun Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 233 days.

(21) Appl. No.: 18/620,182

(22) Filed: Mar. 28, 2024

(65) Prior Publication Data

US 2025/0166907 A1 May 22, 2025

(30) Foreign Application Priority Data

Nov. 21, 2023 (KR) ........................ 10-2023-0161948

(51) Int. Cl.
*H01G 4/12* (2006.01)
*H01G 4/30* (2006.01)

(52) U.S. Cl.
CPC ............. *H01G 4/1227* (2013.01); *H01G 4/30* (2013.01)

(58) Field of Classification Search
CPC ........... H01G 4/30; H01G 4/12; H01G 4/1227
USPC ......... 361/301.4, 321.1, 321.2, 321.4, 321.5, 361/311, 312
See application file for complete search history.

(56) References Cited

U.S. PATENT DOCUMENTS

| | | | | |
|---|---|---|---|---|
| 10,600,572 | B2 * | 3/2020 | Kim | C04B 35/6281 |
| 11,469,046 | B2 | 10/2022 | Hashimoto et al. | |
| 11,594,373 | B2 | 2/2023 | Hashimoto et al. | |
| 2009/0073635 | A1 * | 3/2009 | Taniguchi | H01G 4/1227 156/89.12 |
| 2018/0130601 | A1 * | 5/2018 | Kim | H01G 4/33 |
| 2020/0411241 | A1 | 12/2020 | Hashimoto et al. | |

(Continued)

FOREIGN PATENT DOCUMENTS

| | | | |
|---|---|---|---|
| KR | 10-2022-0121024 | A | 8/2022 |
| KR | 10-2022-0167599 | A | 12/2022 |
| KR | 10-2523255 | B1 | 4/2023 |

*Primary Examiner* — Arun Ramaswamy
(74) *Attorney, Agent, or Firm* — Morgan, Lewis & Bockius LLP

(57) ABSTRACT

A multilayer ceramic capacitor includes: a capacitor body that includes a dielectric layer and an internal electrode layer; and an external electrode that is disposed outside the capacitor body. The dielectric layer includes a plurality of dielectric grains, at least one of the dielectric grains includes a core portion and a shell portion surrounding at least a portion of the core portion, the shell portion includes a barium titanate-based primary component including barium (Ba) and titanium (Ti) and a secondary component including tin (Sn), the shell portion includes a Sn concentrated region including tin (Sn) and a Sn non-concentrated region including tin (Sn) with an atom % less than that of the Sn concentrated region, and an atomic ratio of tin (Sn) included in the Sn concentrated region to tin (Sn) included in the Sn non-concentrated region is 2.0 to 6.0.

19 Claims, 11 Drawing Sheets

(56) References Cited

U.S. PATENT DOCUMENTS

| | | | | |
|---|---|---|---|---|
| 2022/0139632 | A1* | 5/2022 | Kim | H01G 4/224<br>361/321.4 |
| 2022/0199326 | A1* | 6/2022 | Kim | H01G 4/012 |
| 2022/0270822 | A1 | 8/2022 | Baik et al. | |
| 2022/0375688 | A1* | 11/2022 | Yoon | H01G 4/1227 |
| 2022/0399165 | A1 | 12/2022 | Kim et al. | |
| 2023/0207212 | A1* | 6/2023 | Jeon | H01G 4/30<br>361/306.3 |

* cited by examiner

MULTILAYER CERAMIC CAPACITOR AND METHOD OF MANUFACTURING THE SAME

CROSS-REFERENCE TO RELATED APPLICATION

This application claims priority to and the benefit of Korean Patent Application No. 10-2023-0161948 filed at the Korean Intellectual Property Office on Nov. 21, 2023, the entire contents of which are incorporated herein by reference.

BACKGROUND

(a) Technical Field

The present disclosure relates to a multilayer ceramic capacitor and a method of manufacturing the same.

(b) Description of the Related Art

An electronic component that uses a ceramic material includes a capacitor, an inductor, a piezoelectric element, a varistor, a thermistor, or the like. A multilayer ceramic capacitor (MLCC) among the ceramic electronic component may be used in various electronic devices due to its advantages of being small, high-capacity, and easy to mount.

For example, the multilayer ceramic capacitor (MLCC) may be installed at substrates of various electronic products such as an imaging device such as a liquid crystal display device (LCD), a plasma display device panel (PDP), an organic light emitting diode (OLED), or the like, a computer, a personal portable terminal, and a smartphone so that the multilayer ceramic capacitor (MLCC) is used as a chip-type condenser that plays a role in charging or discharging electricity therein or therefrom.

In particular, as a demand for ultra-small and high-capacity MLCC for IT is increasing, high reliability is required under ultra-thin design.

SUMMARY

An embodiment provides a multilayer ceramic capacitor with excellent reliability in a thin layer.

Another embodiment provides a method of manufacturing the multilayer ceramic capacitor.

A multilayer ceramic capacitor according to an embodiment includes: a capacitor body that includes a dielectric layer and an internal electrode layer; and an external electrode that is disposed outside the capacitor body. The dielectric layer includes a plurality of dielectric grains, at least one dielectric grain among the plurality of dielectric grains includes a core portion and a shell portion surrounding at least a portion of the core portion, the shell portion includes a barium titanate-based primary component including barium (Ba) and titanium (Ti) and a secondary component including tin (Sn), the shell portion includes a Sn concentrated region including tin (Sn) and a Sn non-concentrated region including tin (Sn) with an atom % less than an atom % of tin (Sn) in the Sn concentrated region, and an atomic ratio of tin (Sn) included in the Sn concentrated region to tin (Sn) included in the Sn non-concentrated region is 2.0 to 6.0.

The shell portion may be a region from an outermost portion of the at least one dielectric grain to a depth of 15 nm to 25 nm inside the at least one dielectric grain.

In transmission electron microscope dispersion spectroscopy (EDS) line analysis of a straight-line section from one outermost point of the at least one dielectric grain to the other outermost point of the at least one dielectric grain across a center of the at least one dielectric grain, the Sn concentrated region may have a peak with the highest atom % of tin (Sn).

The Sn non-concentrated region may include tin (Sn) in an amount of 0.8 atom % or less based on a total amount of elements in the shell portion.

A length of the Sn concentrated region may be 40% to 100% of a long axis length of the at least one dielectric grain.

The plurality of dielectric grains include 30 to 50 dielectric grains, and the Sn concentrated region may be included in 30% to 100% of the 30 to 50 dielectric grains.

An average grain size of the at least one dielectric grain may be 80 nm to 160 nm.

The core portion may include the barium titanate-based primary component including barium (Ba) and titanium (Ti).

Tin (Sn) may be included in an amount of 0.01 parts by mole to 5 parts by mole based on 100 parts by mole of the barium titanate-based primary component within the shell portion.

The secondary component may further include dysprosium (Dy), terbium (Tb), manganese (Mn), vanadium (V), barium (Ba), silicon (Si), aluminum (Al), calcium (Ca), or a combination thereof.

Within the shell portion, based on 100 parts by mole of the barium titanate-based primary component, dysprosium (Dy) may be included in an amount of 0.01 parts by mole to 5 parts by mole, terbium (Tb) may be included in an amount of 0.01 parts by mole to 5 parts by mole, manganese (Mn) may be included in an amount of 0.01 parts by mole to 5 parts by mole, vanadium (V) may be included in an amount of 0.01 parts by mole to 5 parts by mole, barium (Ba) may be included in an amount of 0.01 parts by mole to 5 parts by mole, silicon (Si) may be included in an amount of 0.01 parts by mole to 5 parts by mole, aluminum (Al) may be included in an amount of 0.01 parts by mole to 5 parts by mole, calcium (Ca) may be included in an amount of 0.01 parts by mole to 5 parts by mole, or a combination thereof.

The secondary component may further include dysprosium (Dy).

A method of manufacturing the multilayer ceramic capacitor according to an embodiment includes: preparing a dielectric slurry by mixing a barium titanate-based primary component powder and a secondary component powder including a tin (Sn)-containing compound; manufacturing a dielectric green sheet from the dielectric slurry and forming a conductive paste layer on a surface of the dielectric green sheet; manufacturing a dielectric green sheet laminate by laminating a plurality of the dielectric green sheet on which the conductive paste layer is formed; manufacturing a capacitor body including a dielectric layer and an internal electrode layer by firing the dielectric green sheet laminate; and forming an external electrode on one surface of the capacitor body. The dielectric layer includes a plurality of dielectric grains, at least one of the dielectric grains includes a core portion and a shell portion surrounding at least a portion of the core portion, the shell portion includes a barium titanate-based primary component including barium (Ba) and titanium (Ti) and a secondary component including tin (Sn), the shell portion includes a Sn concentrated region including tin (Sn) and a Sn non-concentrated region including tin (Sn) with an atom % less than an atom % of tin (Sn) in the Sn concentrated region, and an atomic ratio of tin (Sn)

included in the Sn concentrated region to tin (Sn) included in the Sn non-concentrated region is 2.0 to 6.0.

The tin (Sn)-containing compound may be mixed in an amount of 0.01 parts by mole to 5 parts by mole based on 100 parts by mole of the barium titanate-based primary component powder.

The secondary component powder may further include a dysprosium (Dy)-containing compound, a terbium (Tb)-containing compound, a manganese (Mn)-containing compound, a vanadium (V)-containing compound, a barium (Ba)-containing compound, a silicon (Si)-containing compound, an aluminum (Al)-containing compound, a calcium (Ca)-containing compound, or a combination thereof.

Based on 100 parts by mole of the barium titanate-based primary component powder, the dysprosium (Dy)-containing compound may be included in an amount of 0.01 parts by mole to 5 parts by mole, the terbium (Tb)-containing compound may be included in an amount of 0.01 parts by mole to 5 parts by mole, the manganese (Mn)-containing compound may be included in an amount of 0.01 parts by mole to 5 parts by mole, the vanadium (V)-containing compound may be included in an amount of 0.01 parts by mole to 5 parts by mole, the barium (Ba)-containing compound may be included in an amount of 0.01 parts by mole to 5 parts by mole, the silicon (Si)-containing compound may be included in an amount of 0.01 parts by mole to 5 parts by mole, the aluminum (Al)-containing compound may be included in an amount of 0.01 parts by mole to 5 parts by mole, the calcium (Ca)-containing compound may be included in an amount of 0.01 parts by mole to 5 parts by mole, or a combination thereof.

The dielectric green sheet laminate may be fired at a firing temperature of more than 1160° C. to 1220° C. or less.

The dielectric green sheet laminate may be fired in an atmosphere having a hydrogen ($H_2$) concentration of 1.0% or less.

The secondary component powder may further include a dysprosium (Dy)-containing compound.

The multilayer ceramic capacitor according to the embodiment may improve reliability in a thin layer by suppressing grain growth of a dielectric grain and improving resistance of a grain boundary.

BRIEF DESCRIPTION OF THE DRAWINGS

FIG. 7 is an SEM image of the dielectric layer according to Example 1.

FIG. 8 is an SEM image of a dielectric layer according to Comparative Example 1.

DETAILED DESCRIPTION

Figure 1:
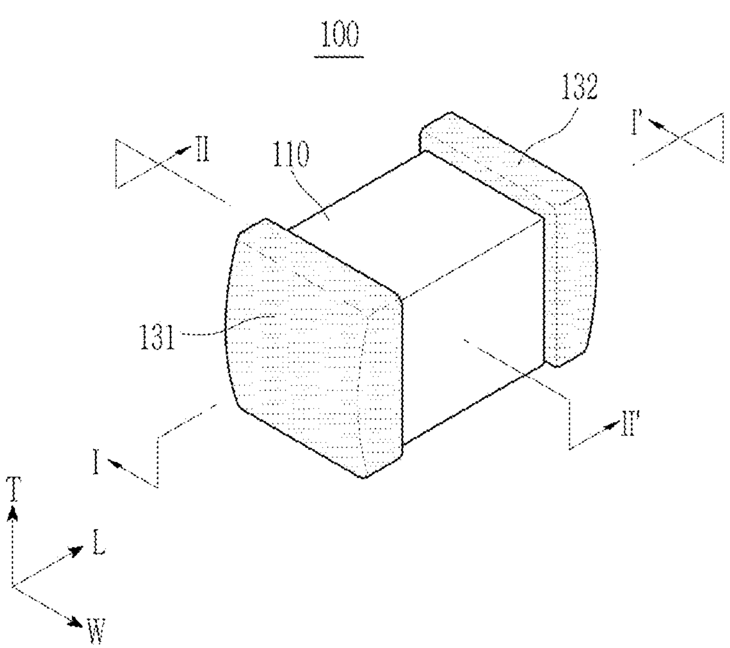
FIG. 1 is a perspective view showing a multilayer ceramic capacitor according to an embodiment.

The present disclosure will be described more fully hereinafter with reference to the accompanying drawings, in which embodiments of the disclosure are shown. In order to clearly describe the present disclosure, parts or portions that are irrelevant to the description are omitted, and identical or similar constituent elements throughout the specification are denoted by the same reference numerals. Additionally, in the accompanying drawings, some constituent elements are exaggerated, omitted, or schematically shown, and a size of each constituent element does not entirely reflect an actual size.

The accompanying drawings are provided only in order to allow embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including an ordinal number such as first, second, and the like may be used to describe various constituent elements, but the constituent elements are not limited by the terms. The terms are used only for the purpose of distinguishing one constituent element from another.

It will be understood that when an element such as a layer, film, region, area, or substrate is referred to as being "on" or "above" another element, it may be directly on the other element or intervening elements may also be present. In contrast, when an element is referred to as being "directly on" another element, there are no intervening elements present. Further, in the specification, the word "on" or "above" means disposed on or below the object portion, and does not necessarily mean disposed on the upper side of the object portion based on a gravitational direction.

In the present specification, terms such as "comprise" or "have" are intended to designate that a feature, number, step, operation, constituent element, part, or combination thereof described in the specification exists, and it should be understood as not precluding the possibility of the presence or addition of and one or more other features, numbers, steps, actions, constituent elements, parts, or combinations thereof. In addition, unless explicitly described to the contrary, the word "comprise" and variations such as "comprises" or "comprising" will be understood to imply the inclusion of stated elements but not the exclusion of any other elements.

Further, throughout the specification, the phrase "on a plane" means viewing a target portion from the top, and the phrase "on a cross-section" means viewing a cross-section formed by perpendicularly cutting a target portion from the side.

Throughout the specification, when it is described that a part is "connected" to another part, the part may be "directly connected" to the other element, may be "connected" to the other part through a third part, or may be connected to the other part physically or electrically, and may be referred to by different titles depending on positions or functions, but respective portions that are substantially integrated into one body may be connected to each other.

Hereinafter, a multilayer ceramic capacitor according to an embodiment will be described with reference to FIGS. 1 to 3.

Figure 2:
FIG. 2 is a cross-sectional view of the multilayer ceramic capacitor cut along the line I-I' in FIG. 1.
Figure 2:
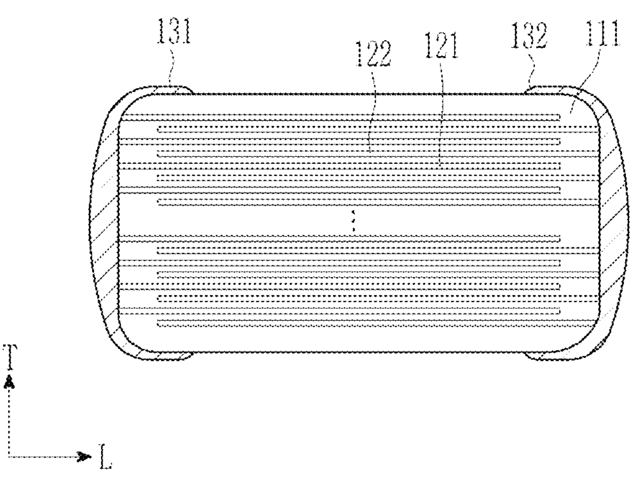
Figure 3:
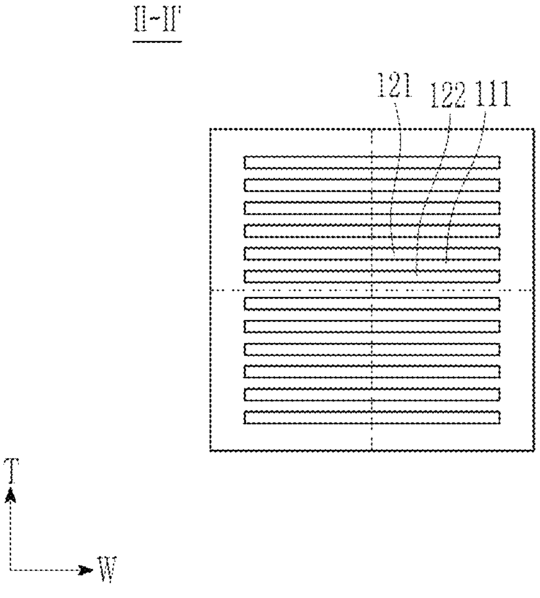
FIG. 3 is a cross-sectional view of the multilayer ceramic capacitor cut along the line II-II' in FIG. 1.

FIG. 1 is a perspective view showing the multilayer ceramic capacitor according to the embodiment, FIG. 2 is a cross-sectional view of the multilayer ceramic capacitor cut along a line I-I' in FIG. 1, and FIG. 3 is a cross-sectional view of the multilayer ceramic capacitor cut along a line II-II' in FIG. 1.

An L-axis, a W-axis, and a T-axis shown in FIGS. 1 to 3 represent a length direction, a width direction, and a thickness direction of a capacitor body 110, respectively. Here, the thickness direction (a T-axis direction) may be a direction perpendicular to a wide surface (a main surface) of a constituent element having a sheet shape. For example, the thickness direction (the T-axis direction) may be used as the same concept as a stacking direction in which dielectric layers 111 is stacked. The length direction (an L-axis direction) may be a direction that extends parallel to the wide surface (the main surface) of the constituent element having the sheet shape, and may be a direction approximately perpendicular to the thickness direction (the T-axis direction). For example, the length direction (the L-axis direction) may be a direction in which a first external electrode 131 and a second external electrode 132 are disposed at both surfaces. The width direction (a W-axis direction) is a direction that extends parallel to the wide surface (the main surface) of the constituent element having the sheet shape, and may be a direction approximately perpendicular to the thickness direction (the T-axis direction) and the length direction (the L-axis direction), and a length of the constituent element having the sheet shape in the length direction (the L-axis direction) may be greater than a length of the constituent element having the sheet shape in the width direction (the W-axis direction).

Referring to FIGS. 1 to 3, the multilayer ceramic capacitor 100 according to the embodiment includes the capacitor body 110, and the external electrodes 131 and 132 disposed outside the capacitor body 110. The external electrodes 131 and 132 may include the first external electrode 131 and the second external electrode 132 disposed at both ends of the capacitor body 110 facing each other in the length direction (the L-axis direction).

For example, the capacitor body 110 may have an approximately hexahedral shape.

For convenience of description of the embodiment, both surfaces of the capacitor body 110 facing each other in the thickness direction (the T-axis direction) are defined as a first surface and a second surface, both surfaces connected to the first surface and the second surface and facing each other in the length direction (the L-axis direction) are defined as a third surface and a fourth surface, and both surfaces connected to the first and second surfaces and the third and fourth surfaces and facing each other in the width direction (the W-axis direction) are defined as a fifth surface and a sixth surface.

For example, the first surface that is a lower surface may be a surface facing a mounting direction. Additionally, the first to sixth surfaces may be flat, but the present disclosure is not limited thereto. For example, each of the first to sixth surfaces may be a curved surface having a convex central portion, and a corner that is a boundary of the surfaces may be rounded.

A shape and a dimension of the capacitor body 110 and the number of the stacked dielectric layers 111 are not limited to those shown in the drawings of the present disclosure.

The capacitor body 110 includes the plurality of dielectric layers 111 and internal electrode layers 121 and 122. Specifically, the capacitor body 110 includes the plurality of dielectric layers 111 and the first internal electrode 121 and the second internal electrode 122 alternately disposed in the thickness direction (the T-axis direction) with the dielectric layer 111 interposed therebetween.

In this case, a boundary between the dielectric layers 111 of the capacitor body 110 adjacent to each other may be integrated to an extent that it is difficult to check the boundary without using a scanning electron microscope (SEM).

The capacitor body 110 may include an active region. The active region is a region in which the dielectric layer 111 and the internal electrode layers 121 and 122 are alternately disposed, and is a portion that contributes to forming capacitance of the multilayer ceramic capacitor 100. Specifically, the active region may be a region where the first internal electrode 121 or the second internal electrode 122 stacked along the thickness direction (the T-axis direction) overlaps.

Additionally, the capacitor body 110 may further include a cover portion and a side margin portion.

The cover portion may be a margin portion in the thickness direction, and may be respectively disposed at the first and second surfaces of the active region in the thickness direction (the T-axis direction). The cover portion may be a single dielectric layer 111 or two or more dielectric layers 111 respectively stacked on upper and lower surfaces of the active region.

The side margin portion may be referred to as a side surface cover portion, and may be respectively disposed at both side end portions (that is, the fifth surface and the sixth surface) of the active region facing each other in the width direction (the W-axis direction). Dielectric green sheets in which a conductive paste layer is applied only on some regions of a surface of the dielectric green sheet and no conductive paste layer is applied on both side surfaces of the surface of the dielectric green sheet when the conductive paste layer is applied on the surface of the dielectric green sheet, may be stacked. The side margin portion may be formed by firing the stacked dielectric green sheets, but the present disclosure is not limited to the forming method.

The cover portion and the side margin portion serve to prevent damage to the first internal electrode 121 and the second internal electrode 122 due to physical or chemical stress.

The dielectric layer 111 includes a plurality of dielectric grains.

The dielectric grain according to an embodiment will be described with reference to FIG. 4.

Figure 4:
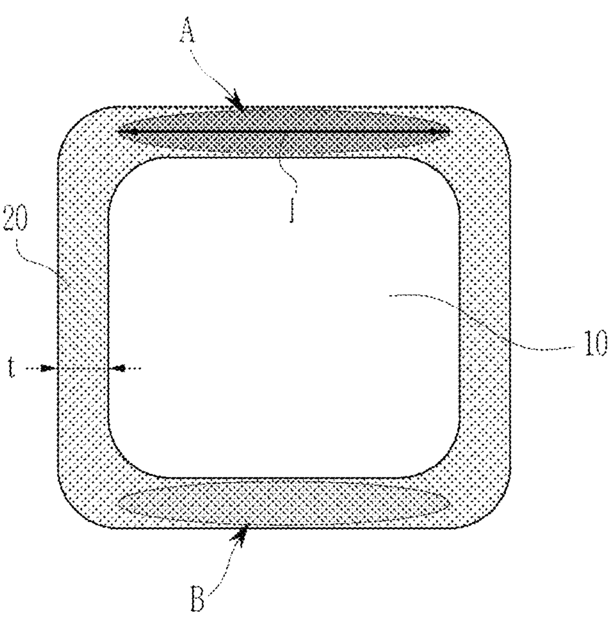
FIG. 4 is a schematic diagram showing a structure of one dielectric grain within a dielectric layer according to an embodiment.

FIG. 4 is a schematic diagram showing a structure of one dielectric grain within the dielectric layer according to an embodiment.

Referring to FIG. 4, at least one of the plurality of dielectric grains includes a core portion 10 and a shell portion 20 surrounding at least a portion of the core portion 10.

The core portion 10 may include a barium titanate-based primary component including barium (Ba) and titanium (Ti).

The shell portion 20 may include a barium titanate-based primary component including barium (Ba) and titanium (Ti), and a secondary component including tin (Sn).

The barium titanate-based primary component included in the core portion 10 and the shell portion 20 is a dielectric base material, has a high dielectric constant, and contributes to formation of a dielectric constant of the multilayer ceramic capacitor 100.

For example, the barium titanate-based primary component may include $BaTiO_3$, $Ba(Ti,Zr)O_3$, $Ba(Ti,Sn)O_3$, (Ba, Ca)$TiO_3$, (Ba,Ca)(Ti,Ca)$O_3$, (Ba,Ca)(Ti,Zr)$O_3$, (Ba,Ca) (Ti, Sn)$O_3$, (Ba,Sr)$TiO_3$, (Ba,Sr)(Ti,Zr)$O_3$, (Ba, Sr)(Ti, Sn)$O_3$, or a combination thereof.

The shell portion 20 includes a Sn concentrated region A and a Sn non-concentration region B. The Sn concentrated region A includes tin (Sn), and is a region in which a concentration of tin (Sn) is relatively high. The Sn non-concentrated region B is a region that does not include tin (Sn) or includes tin (Sn) having a relatively low concentration.

Specifically, the shell portion 20 may include the Sn concentrated region A having a high concentration of tin (Sn) that is a high atom % content of tin (Sn), and the Sn non-concentrated region B having a relatively low concentration of tin (Sn) that is an atom % content of tin (Sn) lower than that of the Sn concentrated region A.

Generally, in order to improve reliability of the multilayer ceramic capacitor, a size of the dielectric grain has to be small and the number of grains per layer of the dielectric layer has to be large. However, because a thickness of the dielectric layer is thin in a thin layer, there may be a case where only 1 to 2 dielectric grains exist per layer due to a grain-grown dielectric grain. Thus, the reliability may be deteriorated. According to an embodiment, grain growth of the dielectric grain may be suppressed due to doping of tin (Sn) into the barium titanate-based primary component. In addition, because band gap energy of the tin (Sn) is larger than that of the barium titanate-based primary component, the tin (Sn) may be concentrated so that grain boundary resistance increases if the Sn concentrated region A exists in the shell portion 20 within the dielectric grain.

In other words, if there is the Sn concentrated region A with the high concentration of tin (Sn) and the Sn non-concentrated region B with the relatively low concentration of tin (Sn) in the shell portion 20 within the dielectric grain, reliability in the thin layer may be improved by suppressing the grain growth of the dielectric grain and increasing the resistance of the grain boundary.

Specifically, an atomic ratio of tin (Sn) included in the Sn concentrated region A to tin (Sn) included in the Sn non-concentrated region B may be 2.0 to 6.0, 2.1 to 5.5, or 2.2 to 5.0. If the atomic ratio is within the above range, the reliability in the thin layer may be improved by suppressing the grain growth of the dielectric grain and increasing the resistance of the grain boundary.

The shell portion 20 may be a region from an outermost portion of the dielectric grain to a depth of 15 nm to 25 nm or 17 nm to 23 nm inside the dielectric grain. That is, a thickness t of the shell portion 20 may be 15 nm to 25 nm or 17 nm to 23 nm.

The thickness t of the shell portion 20, the Sn concentrated region A and the Sn non-concentrated region B present in the shell portion 20, the atom % of Sn in each of the concentrated and non-concentrated regions A and B, the atomic ratio of tin (Sn) between the Sn concentrated region A and the Sn non-concentrated region B, the length of the Sn concentrated region A, and the percentage of dielectric grains in the dielectric layer having the Sn concentrated region may be confirmed through transmission electron microscope (TEM)-energy dispersion spectroscopy (EDS) line analysis. Other methods and/or tools appreciated by one of ordinary skill in the art, even if not described in the present disclosure, may also be used.

The transmission electron microscope (TEM)-energy dispersion spectroscopy (EDS) line analysis may be performed by the following method. A cross-sectional sample in which a surface in the W-axis and T-axis directions (a WT surface) of the capacitor body 110 is polished to a ½ depth position in the L-axis direction after the multilayer ceramic capacitor 100 is put into an epoxy mixing solution and the put multilayer ceramic capacitor 100 is cured and the polished capacitor body is maintained within a vacuum atmosphere chamber so that the active region where the dielectric layer 111 and each of the internal electrode layers 121 and 122 cross each other is observed, may be obtained. Subsequently, the active portion of the cross-sectional sample may be measured using a transmission electron microscope (TEM) so that at least one layer (for example, one to five layers) of the dielectric layer 111 is visible. For example, the TEM may measure the active portion of the cross-sectional sample under a condition of an acceleration voltage of 200 kV using a Xe-focused ion beam (FIB) in a region of about 300 nm×300 nm within the dielectric layer 111. Next, in the TEM image of the measured cross-sectional sample, the EDS-line analysis is performed on a straight-line section from one outermost point of the dielectric grain to the other outermost point of the dielectric grain across a center of the dielectric grain. Through the EDS-line analysis, the core-shell structure, the atomic ratio of tin (Sn) between the Sn concentrated region A and the Sn non-concentrated region B, and the like may be confirmed.

In the transmission electron microscope (TEM)-energy dispersion spectroscopy (EDS) line analysis performed by the above-described method, the Sn concentrated region A may be a region where a peak with the highest atom % of the tin (Sn) appears.

In the Sn concentrated region A, tin (Sn) may be included in an amount of 0.1 atom % to 3 atom % or 0.5 atom % to 2.8 atom % based on a total amount of the shell portion 20, for example, a total amount of elements, for example, Ba, Ti, O, and Sn, in the shell portion 20. Additionally, in the Sn non-concentrated region B, tin (Sn) may be included in an amount of 0.8 atom % or less, 0.01 atom % to 0.8 atom %, or 0.1 atom % to 0.6 atom % based on a total amount of the shell portion 20, for example, a total amount of elements, for example, Ba, Ti, O, and Sn, in the shell portion 20. If tin (Sn) in each of the Sn concentrated region A and the Sn non-concentrated region B is included within the above content range, the grain growth of the dielectric grain may be suppressed and the resistance of the grain boundary may be increased, so that high reliability in the thin layer is secured.

The Sn concentrated region A may exist in a shape having a predetermined length (l) and a predetermined thickness.

The length l of the Sn concentrated region A may be 40% to 100%, 50% to 100%, or 60% to 100% of a long axis length of the dielectric grain. If the length of the Sn concentrated region A is within the range, a resistance characteristic of the grain boundary may be improved.

One to four Sn concentrated regions A or two to three Sn concentrated regions A may be present within one dielectric grain, specifically, within the shell portion 20 of one dielectric grain.

In addition, on a TEM image with 30 to 50 dielectric grains within one dielectric layer 111, the Sn concentrated region A may exist in the number corresponding to 30% to 100% of the number of the dielectric grains. If the Sn concentrated region A exists in the above number range within the dielectric layer 111, the grain growth of the dielectric grain may be suppressed and the resistance of the grain boundary may be increased, so that the reliability in the thin layer is improved. The TEM image may be measured under a condition of an acceleration voltage of 200 kV using a Xe-focused ion beam (FIB) in a region of about 1.3 μm×1.3 μm where the dielectric layer 111 is visible.

An average grain size of the at least one dielectric grain according to an embodiment may be 80 nm to 160 nm or 90 nm to 150 nm. If the average grain size of the dielectric grain is within the above range, the grain growth of the dielectric grain may be suppressed so that the reliability in the thin layer is improved.

An average grain size of the dielectric grain may be obtained by scanning electron microscope (SEM) analysis. Specifically, a cross-sectional sample in which a surface in the W-axis and T-axis directions (a WT surface) of the capacitor body is polished to a ½ point in the L-axis direction after the multilayer ceramic capacitor is put into an epoxy mixing solution and the put multilayer ceramic capacitor is cured and the polished capacitor body is maintained within a vacuum atmosphere chamber so that the active portion where the dielectric layer and each of the internal electrode layers cross each other is observed, may be obtained. Subsequently, the cross-sectional sample may be measured by the scanning electron microscope (SEM) so that at least two dielectric layers are visible at the active portion of the cross-sectional sample. For example, the SEM may be the Verios G4 product from Thermo Fisher Scientific Inc., and the SEM may measure the active portion of the cross-sectional sample under a condition of an acceleration voltage of 200 kV using a Xe-focused ion beam (FIB) in a region of about 2.2 μm×2.2 μm where the two dielectric layers are visible. An average value may be calculated by measuring a diameter of a maximum long axis of at least 100 dielectric grains in the SEM image of the cross-sectional sample. Other methods and/or tools appreciated by one of ordinary skill in the art, even if not described in the present disclosure, may also be used.

Tin (Sn) may be included in an amount of 0.01 parts by mole to 5 parts by mole based on 100 parts by mole of the barium titanate-based primary component within the shell portion 20. If tin (Sn) is included within the above content range in the shell portion 20, the grain growth of the dielectric grain may be suppressed so that the number of dielectric grains per layer of the dielectric layer increases even in the thin layer. Thus, the reliability may be improved.

In addition to tin (Sn), the secondary component included in the shell portion 20 may further include dysprosium (Dy), terbium (Tb), manganese (Mn), vanadium (V), barium (Ba), silicon (Si), aluminum (Al), calcium (Ca), or a combination thereof.

Dysprosium (Dy) may be included in an amount of 0.01 parts by mole to 5 parts by mole or 0.1 parts by mole to 4 parts by mole based on 100 parts by mole of the barium titanate-based primary component. Terbium (Tb) may be included in an amount of 0.01 parts by mole to 5 parts by mole or 0.1 parts by mole to 4 parts by mole based on 100 parts by mole of the barium titanate-based primary component. Manganese (Mn) may be included in an amount of 0.01 parts by mole to 5 parts by mole or 0.1 parts by mole to 4 parts by mole based on 100 parts by mole of the barium titanate-based primary component. Vanadium (V) may be included in an amount of 0.01 parts by mole to 5 parts by mole or 0.1 parts by mole to 4 parts by mole based on 100 parts by mole of the barium titanate-based primary component. Barium (Ba) may be included in an amount of 0.01 parts by mole to 5 parts by mole or 0.1 parts by mole to 4 parts by mole based on 100 parts by mole of the barium titanate-based primary component. Silicon (Si) may be included in an amount of 0.01 parts by mole to 5 parts by mole or 0.1 parts by mole to 4 parts by mole based on 100 parts by mole of the barium titanate-based primary component. Aluminum (Al) may be included in an amount of 0.01 parts by mole to 5 parts by mole or 0.1 parts by mole to 4 parts by mole based on 100 parts by mole of the barium titanate-based primary component. Calcium (Ca) may be included in an amount of 0.01 parts by mole to 5 parts by mole or 0.1 parts by mole to 4 parts by mole based on 100 parts by mole of the barium titanate-based primary component. The reliability in the thin layer may be improved if each secondary component is included within the content range. The contents of tin (Sn), dysprosium (Dy), terbium (Tb), manganese (Mn), vanadium (V), barium (Ba), silicon (Si), aluminum (Al), and calcium (Ca) based on 100 parts by mole of the barium titanate-based primary component may be obtained from SEM-EDS analysis. Other methods and/or tools appreciated by one of ordinary skill in the art, even if not described in the present disclosure, may also be used. The content of each of tin (Sn), dysprosium (Dy), terbium (Tb), manganese (Mn), vanadium (V), barium (Ba), silicon (Si), aluminum (Al), and calcium (Ca), if present, may substantially correspond to the content of each component present in the dielectric slurry used to form the dielectric layer.

An average thickness of the dielectric layer 111 may be 0.1 μm to 8.0 μm or 0.3 μm to 3.0 μm. If the average thickness of the dielectric layer 111 is within the range, a thin-layer multilayer ceramic capacitor with high reliability may be secured.

The average thickness of the dielectric layer 111 may be measured by scanning electron microscope (SEM) analysis by putting the multilayer ceramic capacitor 100 into an epoxy mixing solution, curing the put multilayer ceramic capacitor 100, polishing the cured multilayer ceramic capacitor, and then ion milling the polished multilayer ceramic capacitor. For example, the SEM may be the Verios G4 product from Thermo Fisher Scientific Inc., the measurement condition may be 10 kV and 0.2 nA, an analysis magnification may be 100 times, and at least 1 or more layers (for example, 3 or more layers, 5 or more layers, or 10 or more layers) of the dielectric layer 111 may be measured. In the scanning electron microscope (SEM) image, a central point of the dielectric layer 111 in the length direction (the L-axis direction) or the width direction (the W-axis direction) may be used as a reference point. The average thickness of the dielectric layer 111 may be an arithmetic average value of thicknesses of the dielectric layer 111 at ten points spaced apart from the reference point. An interval of the ten points may be adjusted according to a scale of the scanning electron microscope (SEM) image. For example, the interval of the ten points may be 1 μm to 100 μm, 1 μm to 50 μm, or 1 μm to 10 μm. In this case, all ten points have to be disposed within the dielectric layer 111. If all ten points are not disposed within the dielectric layer 111, a position of the reference point may be changed, or the interval between the ten points may be adjusted.

The first internal electrode 121 and the second internal electrode 122 may be electrodes with different polarities, the first internal electrode 121 and the second internal electrode 122 may be alternately disposed to face each other along the T-axis direction with the dielectric layer 111 interposed therebetween, and one end of each of the first internal electrode 121 and the second internal electrode 122 may be exposed through each of the third surface and the fourth surface of the capacitor body 110.

The first internal electrode 121 and the second internal electrode 122 may be electrically insulated from each other by the dielectric layer 111 disposed in the middle thereof.

End portions of the first internal electrode 121 and the second internal electrode 122 that are alternately exposed through the third and fourth surfaces of the capacitor body 110 may be electrically connected to the first external electrode 131 and the second external electrode 132, respectively.

Each of the first internal electrode 121 and the second internal electrode 122 may include a conductive metal, and for example, each of the first internal electrode 121 and the second internal electrode 122 may include a metal such as Ni, Cu, Ag, Pd, Au, or the like, or an alloy thereof (for example, an Ag—Pd alloy).

Additionally, each of the first internal electrode 121 and the second internal electrode 122 may include a dielectric particle of the same composition as that of a ceramic material included in the dielectric layer 111.

Each of the first internal electrode 121 and the second internal electrode 122 may be formed using a conductive paste including the conductive metal. A printing method of the conductive paste may be a screen printing method or a gravure printing method.

An average thickness of each of the first internal electrode 121 and the second internal electrode 122 may be 0.1 μm to 2 μm. The average thickness of each of the first internal electrode 121 and the second internal electrode 122 may be measured by scanning electron microscope (SEM) analysis. Here, because the scanning electron microscope (SEM) analysis is the same as a method of measuring the average thickness of the dielectric layer 111 described above, a description thereof is omitted.

The capacitor body 110 may be formed by firing a laminate in which the plurality of dielectric layers 111 and the internal electrode layers 121 and 122 are stacked.

The first external electrode 131 and the second external electrode 132 may be provided with voltages having different polarities, and may be electrically connected to exposed portions of the first internal electrode 121 and the second internal electrode 122, respectively.

If a predetermined voltage is applied to the first external electrode 131 and the second external electrode 132, an electric charge is accumulated between the first internal electrode 121 and the second internal electrode 122 that face each other. In this case, capacitance of the multilayer ceramic capacitor 100 is proportional to overlapped areas of the first internal electrode 121 and the second internal electrode 122 that overlap each other along the T-axis direction in the active region.

Each of the first external electrode 131 and the second external electrode 132 may include first and second connection portions respectively disposed on the third and fourth surfaces of the capacitor body 110 to be connected to the first internal electrode 121 and the second internal electrode 122, and first and second band portions disposed at corners where the third and fourth surfaces of the capacitor body 110 meet the first and second surfaces or the fifth and sixth surfaces of the capacitor body 110.

The first and second band portions may extend from the first and second connection portions to portions of the first and second surfaces or the fifth and sixth surfaces of the capacitor body 110, respectively. The first and second band portions may serve to improve an adhesion strength of the first external electrode 131 and the second external electrode 132.

Each of the first external electrode 131 and the second external electrode 132 may include a sintering metal layer in contact with the capacitor body 110, a conductive resin layer disposed to cover the sintering metal layer, and a plating layer disposed to cover the conductive resin layer.

The sintered metal layer may include a conductive metal and a glass.

The conductive metal may include copper (Cu), nickel (Ni), silver (Ag), palladium (Pd), gold (Au), platinum (Pt), tin (Sn), tungsten (W), titanium (Ti), lead (Pb), an alloy thereof, or a combination thereof, and for example, the copper (Cu) may include a copper (Cu) alloy. If the conductive metal includes copper, a metal other than copper may be included in an amount of 5 parts by mole or less with respect to 100 parts by mole of copper.

The glass may include a composition of mixed oxides, and for example, the composition may be one or more selected from the group consisting of silicon oxide, boron oxide, aluminum oxide, transition metal oxide, alkali metal oxide, and alkaline-earth metal oxide. The transition metal may be selected from the group consisting of zinc (Zn), titanium (Ti), copper (Cu), vanadium (V), manganese (Mn), iron (Fe), and nickel (Ni), the alkali metal may be selected from the group consisting of lithium (Li), sodium (Na), and potassium (K), and the alkaline-earth metal may be one or more selected from the group consisting of magnesium (Mg), calcium (Ca), strontium (Sr), and barium (Ba).

Selectively, the conductive resin layer may be formed on the sintering metal layer, and for example, may be formed to completely cover the sintering metal layer. On the other hand, the first external electrode 131 and the second external electrode 132 may not include the sintering metal layer, and in this case, the conductive resin layer may directly contact the capacitor body 110.

The conductive resin layer may extend to the first and second surfaces or the fifth and sixth surfaces of the capacitor body 110, and a length of a region (i.e., the band portion) in which the conductive resin layer extends to the first and second surfaces or the fifth and sixth surfaces of the capacitor body 110 may be greater than a length of a region (i.e., the band portion) in which the sintering metal layer extends to the first and second surfaces or the fifth and sixth surfaces of the capacitor body 110. In other words, the conductive resin layer may be formed on the sintering metal layer, and may be formed to completely cover the sintering metal layer.

The conductive resin layer includes a resin and a conductive metal.

The resin included in the conductive resin layer is not particularly limited as long as it has a bonding property and an impact absorption property and is mixed with a conductive metal powder to make a paste, and for example, may include a phenolic resin, an acrylic resin, a silicone resin, an epoxy resin, or a polyimide resin.

The conductive metal included in the conductive resin layer serves to be electrically connected to the first internal electrode 121 and the second internal electrode 122 or the sintering metal layer.

The conductive metal included in the conductive resin layer may have a spherical shape, a flake shape, or a combination thereof. In other words, the conductive metal may be made only in the flake shape, may be made only in the spherical shape, or may have a mixture of the flake shape and the spherical shape.

Here, the spherical shape may include a shape that is not a complete spherical shape, and for example, may include a shape in which a length ratio (a long axis/a short axis) of a long axis to a short axis is 1.45 or less. The powder having the flake shape refers to a powder that has a flat and elongated shape, and the flake shape is not particularly limited, but for example, the flake shape may include a shape in which a length ratio (a long axis/a short axis) of a long axis to a short axis is 1.95 or more.

Each of the first external electrode 131 and the second external electrode 132 may further include a plating layer disposed outside the conductive resin layer.

The plating layer may include nickel (Ni), copper (Cu), tin (Sn), palladium (Pd), platinum (Pt), gold (Au), silver (Ag), tungsten (W), titanium (Ti), lead (Pb), or an alloy thereof. For example, the plating layer may be a nickel (Ni) plating layer or a tin (Sn) plating layer, may have a shape in which a nickel (Ni) plating layer and a tin (Sn) plating layer are sequentially stacked, and may have a shape in which a tin (Sn) plating layer, a nickel (Ni) plating layer, and a tin (Sn) plating layer are sequentially stacked. Additionally, the plating layer may include a plurality of nickel (Ni) plating layers and/or a plurality of tin (Sn) plating layers.

The plating layer may improve mountability with a substrate, structural reliability, durability against the outside, thermal resistance, or equivalent series resistance (ESR) of the multilayer ceramic capacitor 100.

Hereinafter, a method of manufacturing the multilayer ceramic capacitor 100 according to an embodiment will be described.

The multilayer ceramic capacitor 100 according to the embodiment may be manufactured through a step of preparing a dielectric slurry by mixing a barium titanate-based primary component powder and a secondary component powder that includes a tin (Sn)-containing compound, a step of manufacturing a dielectric green sheet using the dielectric slurry and forming a conductive paste layer on a surface of the dielectric green sheet, a step of manufacturing a dielectric green sheet laminate by laminating dielectric green sheets including the dielectric green sheet on which conductive paste layers including the conductive paste layer are formed, a step of manufacturing the capacitor body including the dielectric layer and the internal electrode layer by firing the dielectric green sheet laminate, and a step of forming the external electrode on one surface of the capacitor body.

First, the dielectric slurry is prepared by mixing the barium titanate-based primary component powder and the secondary component powder containing the tin (Sn)-containing compound.

The barium titanate-based primary component powder may be prepared by mixing a titanium (Ti) precursor and a barium (Ba) precursor.

The titanium (Ti) precursor may be an oxide, a salt, an alkoxide, or the like of titanium, and for example, the titanium (Ti) precursor may include titanium dioxide, titanium diisopropoxide diacetyl acetonate (TPA), titanium alkoxide, or a combination thereof.

The barium (Ba) precursor may include $BaO_2$, $BaTiO_3$, $BaCO_3$, BaO, or a combination thereof.

The barium (Ba) precursor may be included in an amount of 0.9 mole to 1.1 mole based on 1 mole of the titanium (Ti) precursor.

The tin (Sn)-containing compound that is the secondary component powder may be an oxide, a nitride, or a salt compound, or may be used in the form of a sol dispersed in an organic solvent.

The tin (Sn)-containing compound may be mixed in an amount of 0.01 parts by mole to 5 parts by mole or 0.1 parts by mole to 3 parts by mole based on 100 parts by mole of the barium titanate-based primary component powder.

If the tin (Sn)-containing compound is mixed within the content range, the reliability in the thin layer may be improved by suppressing the grain growth of the dielectric grain.

The secondary component powder may further include a dysprosium (Dy)-containing compound, a terbium (Tb)-containing compound, a manganese (Mn)-containing compound, a vanadium (V)-containing compound, a barium (Ba)-containing compound, a silicon (Si)-containing compound, an aluminum (Al)-containing compound, a calcium (Ca)-containing compound, or a combination thereof.

The dysprosium (Dy)-containing compound may be included in an amount of 0.01 parts by mole to 5 parts by mole or 0.1 parts by mole to 4 parts by mole based on 100 parts by mole of the barium titanate-based primary component powder. The terbium (Tb)-containing compound may be included in an amount of 0.01 parts by mole to 5 parts by mole or 0.1 parts by mole to 4 parts by mole based on 100 parts by mole of the barium titanate-based primary component powder. The manganese (Mn)-containing compound may be included in an amount of 0.01 parts by mole to 5 parts by mole or 0.1 parts by mole to 4 parts by mole based on 100 parts by mole of the barium titanate-based primary component powder. The vanadium (V)-containing compound may be included in an amount of 0.01 parts by mole to 5 parts by mole or 0.1 parts by mole to 4 parts by mole based on 100 parts by mole of the barium titanate-based primary component powder. The barium (Ba)-containing compound may be included in an amount of 0.01 parts by mole to 5 parts by mole or 0.1 parts by mole to 4 parts by mole based on 100 parts by mole of the barium titanate-based primary component powder. The silicon (Si)-containing compound may be included in an amount of 0.01 parts by mole to 5 parts by mole or 0.1 parts by mole to 4 parts by mole based on 100 parts by mole of the barium titanate-based primary component powder. The aluminum (Al)-containing compound may be included in an amount of 0.01 parts by mole to 5 parts by mole or 0.1 parts by mole to 4 parts by mole based on 100 parts by mole of the barium titanate-based primary component powder. The calcium (Ca)-containing compound may be included in an amount of 0.01 parts by mole to 5 parts by mole or 0.1 parts by mole to 4 parts by mole based on 100 parts by mole of the barium titanate-based primary component powder. The reliability in the thin layer may be improved if each secondary component powder is included within the content range.

The dielectric slurry may be prepared by additionally mixing an additive (e.g., a dispersant, a binder, a plasticizer, a lubricant, an antistatic agent, or the like) and a solvent.

For example, the dispersant may include a phosphoric acid ester-based dispersant, a polycarboxylic acid-based dispersant, or a combination thereof. The dispersant may be mixed in an amount of 0.1 parts by weight to 5 parts by weight or 0.3 parts by weight to 3 parts by weight based on 100 parts by weight of the barium titanate-based primary component powder. If the dispersant is mixed within the content range, dispersibility of the dielectric slurry may be excellent, and an amount of impurity included in the manufactured dielectric layer may be reduced.

For example, the binder may be an acryl resin, a polyvinylbutyl resin, a polyvinylacetal resin, an ethylcellulose resin, or the like. The binder may be added in an amount of 0.1 parts by weight to 50 parts by weight or 3 parts by weight to 30 parts by weight based on 100 parts by weight of the barium titanate-based primary component powder. If the binder is mixed within the content range, dispersibility of the dielectric slurry may be excellent, and an amount of impurity included in the manufactured dielectric layer may be reduced.

For example, the plasticizer may include a phthalic acid-based compound such as dioctyl phthalate, benzylbutyl phthalate, dibutyl phthalate, dihexyl phthalate, di(2-ethylbutyl) phthalate, or the like, an adipic acid-based compound such as dihexyl adipate, di(2-ethylhexyl) adipate, or the like, a glycolic compound such as ethyleneglycol, diethyleneglycol, triethyleneglycol, or the like, a glycol ester-based compound such as triethylene glycol dibutyrate, triethylene glycol di(2-ethylbutylate), triethylene glycol di(2-ethylhexanoate), or the like. The plasticizer may be added in an amount of 0.1 parts by weight to 20 parts by weight or 1 parts by weight to 10 parts by weight based on 100 parts by weight of the barium titanate-based primary component powder. If the plasticizer is mixed within the content range, dispersibility of the dielectric slurry may be excellent, and an amount of impurity included in the manufactured dielectric layer may be reduced.

The solvent may be an aqueous solvent such as water or the like, an alcohol-based solvent such as ethanol, methanol, benzylalcohol, methoxyethanol, or the like, a glycolic solvent such as ethyleneglycol, diethyleneglycol, or the like, a ketone-based solvent such as acetone, methylethylketone, methylisobutylketone, cyclohexanone, or the like, an ester-based solvent such as butyl acetate, ethyl acetate, carbitolacetate, butylcarbitolacetate, or the like, an ether-based solvent such as methylcellosolve, ethylcellosolve, butylether, tetrahydrofuran, or the like, or an aromatic-based solvent such as benzene, toluene, xylene, or the like. For example, the solvent may use the alcohol-based solvent or the aromatic-based solvent considering solubility or dispersibility of various additives included in the dielectric slurry. The solvent may be mixed in an amount of 50 parts by weight to 1000 parts by weight or 100 parts by weight to 500 parts by weight based on 100 parts by weight of the barium titanate-based primary component powder. If the solvent is mixed within the content range, components of the dielectric slurry may be sufficiently mixed, and then the solvent may be easily removed.

Mixing of the barium titanate-based primary component powder and the secondary component powder may be performed using a wet ball mill or an agitated mill. If a zirconia ball is used in the wet ball mill, wet mixing may be performed for 8 hours to 48 hours or 10 hours to 24 hours using a plurality of zirconia balls with a diameter of 0.1 mm to 10 mm.

The prepared dielectric slurry is formed into the dielectric layer after the firing.

A method for molding the prepared dielectric slurry into a sheet shape may include a tape molding method such as a doctor blade method, a calendar roll method, or the like. For example, the method for molding the prepared dielectric slurry may use an on-roll molding coater of a head discharge type, and the dielectric green sheet may be obtained by drying the molding body.

To form the conductive paste layer that becomes the internal electrode layer after the firing, the conductive paste may be prepared by mixing a conductive powder made of a conductive metal or an alloy thereof, a binder, and a solvent. Additionally, if necessary, a barium titanate powder may be mixed together as a co-material. The co-material may act to suppress sintering of the conductive powder during the firing process. The conductive paste layer is formed by applying the conductive paste to a surface of the dielectric green sheet in a predetermined pattern using various printing or transfer methods such as screen printing and the like.

The conductive powder may include nickel (Ni) or a nickel (Ni) alloy.

Next, the dielectric green sheet where the internal electrode pattern is formed is laminated in a plurality of layers and then the laminated dielectric green sheets are pressed in a laminating direction so that the dielectric green sheet laminate is manufactured. In this case, the dielectric green sheet and the internal electrode pattern may be laminated so that the dielectric green sheet is disposed on upper and lower surfaces of the dielectric green sheet laminate in the laminating direction.

A step of cutting the manufactured dielectric green sheet laminate to a predetermined dimension by dicing or the like may be selectively performed.

In addition, the dielectric green sheet laminate may be solidified and dried to remove the plasticizer or the like if necessary, and after the dielectric green sheet laminate is solidified and dried, barrel polishing may be performed on the solidified and dried laminate using a horizontal centrifugal barrel machine or the like. In the barrel polishing, the dielectric green sheet laminate may be put into a barrel container together with a media and a polishing liquid and rotation motion or vibration may be applied to the barrel container so that an unnecessary portion such as a burr or the like generated during the cutting is polished. Additionally, after the barrel polishing, the dielectric green sheet laminate may be washed with a cleaning solution such as water or the like, and the washed laminate may be dried.

Next, the capacitor body may be manufactured by removing the binder from the dielectric green sheet laminate and firing the dielectric green sheet laminate in which the binder is removed.

The binder removal treatment condition may be appropriately adjusted depending on a component of the dielectric layer or a component of the internal electrode layer. For example, a temperature increase speed during the binder removal treatment may be 5° C./hour to 300° C./hour, a support temperature during the binder removal treatment may be 180° C. to 400° C., and a temperature maintenance time during the binder removal treatment may be 0.5 hours to 24 hours. An atmosphere during the binder removal treatment may be air or a reducing atmosphere.

A condition for the firing treatment may be appropriately adjusted depending on a main component composition of the dielectric layer or a main component composition of the internal electrode. For example, the firing may be performed at a temperature of 1100° C. to 1400° C. or 1150° C. to 1300° C. Additionally, the firing may be performed for 0.5 hours to 8 hours or 1 hour to 3 hours. Additionally, the firing may be performed in a reducing atmosphere (for example, an atmosphere including a humidified mixed gas of nitrogen and hydrogen). If the internal electrode includes nickel (Ni) or a nickel (Ni) alloy, an oxygen partial pressure in the firing atmosphere may be $1.0\times10^{-14}$ MPa to $1.0\times10^{-10}$ MPa.

After the firing treatment, annealing may be performed if necessary. The annealing may be a treatment for re-oxidizing the dielectric layer, and the annealing may be performed if the firing treatment is performed in the reducing atmosphere. A condition of the annealing treatment may be appropriately adjusted depending on a component of the dielectric layer. For example, a temperature during the annealing may be 950° C. to 1150° C., a time during the annealing may be 0 hours to 20 hours, and a temperature increase speed during the annealing may be 50° C./hour to 500° C./hour. An atmosphere of the annealing may be a humidified nitrogen gas ($N_2$) atmosphere, and an oxygen partial pressure in the atmosphere of the annealing may be $1.0\times10^{-9}$ MPa to $1.0\times10^{-5}$ MPa.

In the binder removal treatment, the firing treatment, or the annealing treatment, for example, a wetter or the like may be used to humidify the nitrogen gas, the mixed gas, or the like. In this case, a temperature of water may be 5° C. to 75° C. The binder removal treatment, the firing treatment, or the annealing treatment may be sequentially performed or may be independently performed.

Selectively, a surface treatment such as a sandblasting treatment, laser irradiation, the barrel polishing, or the like may be performed on the third and fourth surfaces of the manufactured capacitor body 110. By performing the surface treatment, end portions of the first internal electrode and the second internal electrode may be exposed on outermost surfaces of the third and fourth surfaces. Thus, electrical bonding between the first and second external electrodes and the first and second internal electrodes may become good, and the alloy portion may be easily formed.

Next, the external electrode is formed on one surface of the manufactured capacitor body 110.

For example, a paste for forming the sintering metal layer may be applied to the external electrode, and then the applied external electrode may be sintered to form the sintering metal layer.

The paste for forming the sintering metal layer may include a conductive metal and a glass. Descriptions of the conductive metal and the glass are the same as those described above so that repeated descriptions thereof are omitted. Additionally, the paste for forming the sintering metal layer may selectively include a binder, a solvent, a dispersant, a plasticizer, an oxide powder, or the like. For example, the binder may use ethylcellulose, acryl, butyral, or the like, and for example, the solvent may use an organic solvent (e.g., terpineol, butylcarbitol, alcohol, methyl ethyl ketone, acetone, toluene, or the like) or an aqueous solvent.

A method for applying the paste for forming the sintering metal layer to an outer surface of the capacitor body 110 may include various printing methods such as a dip method, screen printing, and the like, an application method using a dispenser or the like, a spraying method using a spray, or the like. The paste for forming the sintering metal layer may be applied to at least the third and fourth surfaces of the capacitor body 110, and may selectively be applied to a portion of the first, second, fifth, or sixth surfaces where the band portion of each of the first and second external electrodes is formed.

Thereafter, the capacitor body 110 on which the paste for forming the sintering metal layer is applied is dried, and the dried capacitor body is sintered at a temperature of 700° C. to 1000° C. for 0.1 to 3 hours to form the sintering metal layer.

Selectively, a paste for forming the conductive resin layer may be applied to the outer surface of the capacitor body 110, and then the applied capacitor body may be cured to form the conductive resin layer.

The paste for forming the conductive resin layer may include a resin, and may selectively include a conductive metal or a non-conductive filler. Descriptions of the conductive metal and the resin are the same as those described above so that repeated descriptions thereof are omitted. Additionally, the paste for forming the conductive resin layer may selectively include a binder, a solvent, a dispersant, a plasticizer, an oxide powder, or the like. For example, the binder may be ethylcellulose, acryl, butyral, or the like, and for example, the solvent may be an organic solvent (e.g., terpineol, butylcarbitol, alcohol, methyl ethyl ketone, acetone, toluene, or the like) or an aqueous solvent.

As an example, the conductive resin layer may be formed by dipping the capacitor body 110 into the paste for forming the conductive resin layer and then curing the dipped capacitor body, the conductive resin layer may be formed by printing the paste for forming the conductive resin layer on a surface of the capacitor body 110 using a screen printing method, a gravure printing method, or the like, or the conductive resin layer may be formed by applying the paste for forming the conductive resin layer to the surface of the capacitor body 110 and then curing the applied capacitor body.

Next, the plating layer is formed at the outside of the conductive resin layer.

For example, the plating layer may be formed by a plating method, or may be formed by sputter or electric deposition.

Hereinafter, the above-described embodiment will be described in more detail through an Example below. However, the Example below is for illustrative purpose only and does not limit the scope of the present disclosure.

(Manufacturing of Multilayer Ceramic Capacitor)

Examples 1 to 3 and Comparative Examples 1 to 5

The dielectric slurry is prepared by mixing barium titanate ($BaTiO_3$) that is the primary component powder, and tin oxide ($SnO_2$) and dysprosium oxide ($Dy_2O_3$) that are secondary component powders. In this case, each of tin oxide ($SnO_2$) and dysprosium oxide ($Dy_2O_3$) is mixed in an amount of 1.5 parts by mole based on 100 parts by mole of barium titanate ($BaTiO_3$) that is the primary component powder. The mixing is performed using a zirconium ($ZrO_2$) ball as a dispersion medium, adding ethanol (or toluene), a wetting dispersant, and a polyvinyl butyral (PVB) resin that is a binder, and then performing mechanical milling.

The dielectric green sheet is manufactured using the prepared dielectric slurry through the on-roll molding coater of the head discharge type.

The conductive paste layer including nickel (Ni) is printed on a surface of the dielectric green sheet, and the dielectric green sheet laminate is manufactured by laminating and pressing the dielectric green sheet (a width×a length×a height=3.2 mm×2.5 mm×2.5 mm) on which the conductive paste layer is formed.

A plasticization process is performed on the dielectric green sheet laminate at 400° C. or less in a nitrogen atmosphere, and the dielectric green sheet laminate is fired under conditions of a firing temperature of 1300° C. or less and a hydrogen ($H_2$) concentration of 1.0% or less. Specifically, Comparative Examples 1 to 3 are fired at a temperature of 1140° C. or more to 1160° C. or less, Examples 1 to 3 are fired at a temperature of more than 1160° C. to 1220° C. or less, and Comparative Examples 4 and 5 are fired at a temperature of more than 1220° C. and 1240° C. or less.

Subsequently, the multilayer ceramic capacitor is manufactured through processes such as forming of the external electrode, the plating, and the like.

Evaluation 1: TEM Analysis

Figure 5:
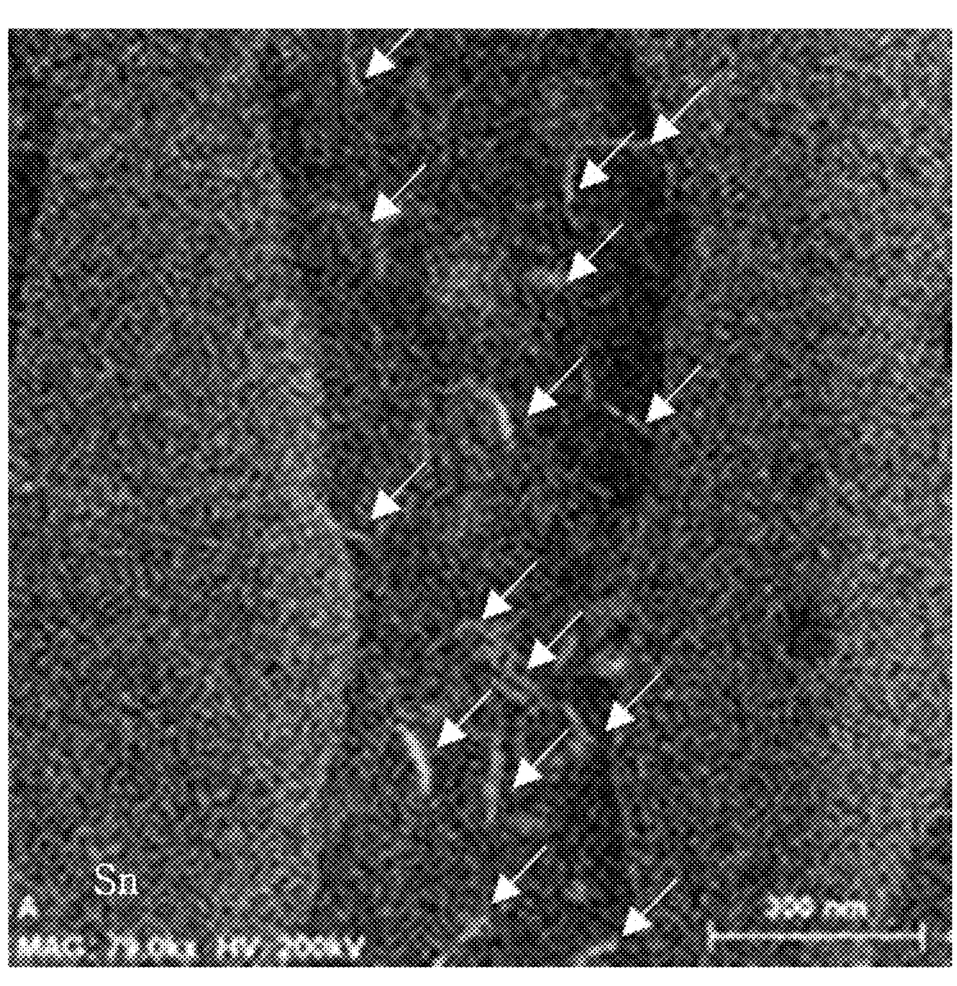
FIG. 5 is a TEM image of a dielectric layer according to Example 1.

Transmission electron microscope (TEM) analysis is performed on the multilayer ceramic capacitor manufactured in Example 1, and the result thereof is shown in FIG. 5.

Specifically, a cross-sectional sample in which a surface in the W-axis and T-axis directions (a WT surface) of the capacitor body 110 is polished to a ½ depth position in the L-axis direction after the multilayer ceramic capacitor 100 manufactured in Example 1 is put into an epoxy mixing solution and the put multilayer ceramic capacitor 100 is cured and the polished capacitor body is maintained within a vacuum atmosphere chamber so that the active region where the dielectric layer 111 and each of the internal electrode layers 121 and 122 cross each other is observed, is obtained. Subsequently, the active region of the cross-sectional sample is measured using the transmission electron microscope (TEM) so that at least one layer of the dielectric layer 111 is visible. The TEM measures the active portion of the cross-sectional sample under a condition of an acceleration voltage of 200 kV using a Xe-focused ion beam (FIB) in a region of about 1.3 μm×1.3 μm where the dielectric layer 111 is visible.

FIG. 5 is the TEM image of the dielectric layer according to Example 1.

Referring to FIG. 5, it may be seen that the dielectric layer according to Example 1 includes a plurality of dielectric grains and at least one of the plurality of dielectric grains has a Sn concentrated region with a high Sn concentration in the shell portion of the core-shell structure.

Evaluation 2: TEM-EDS Line Analysis

Figure 6A:
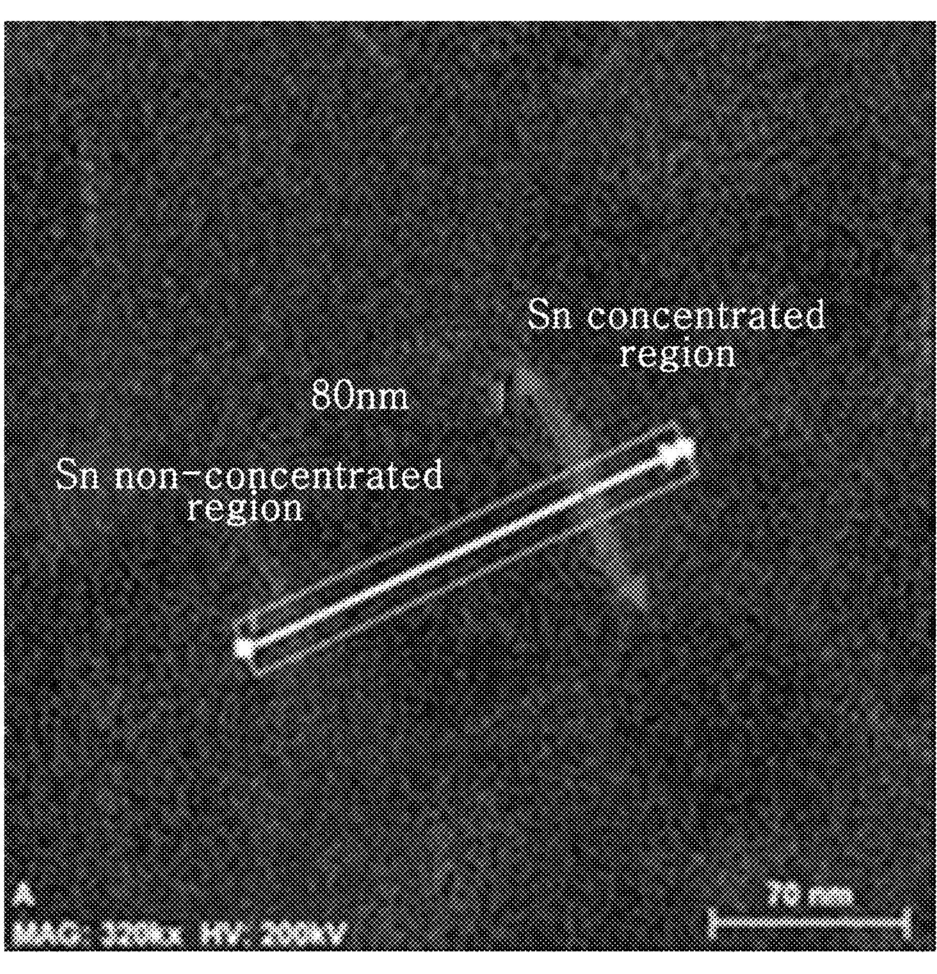
FIG. 6A is a TEM image showing a dielectric grain within the dielectric layer according to Example 1.
Figure 6B:
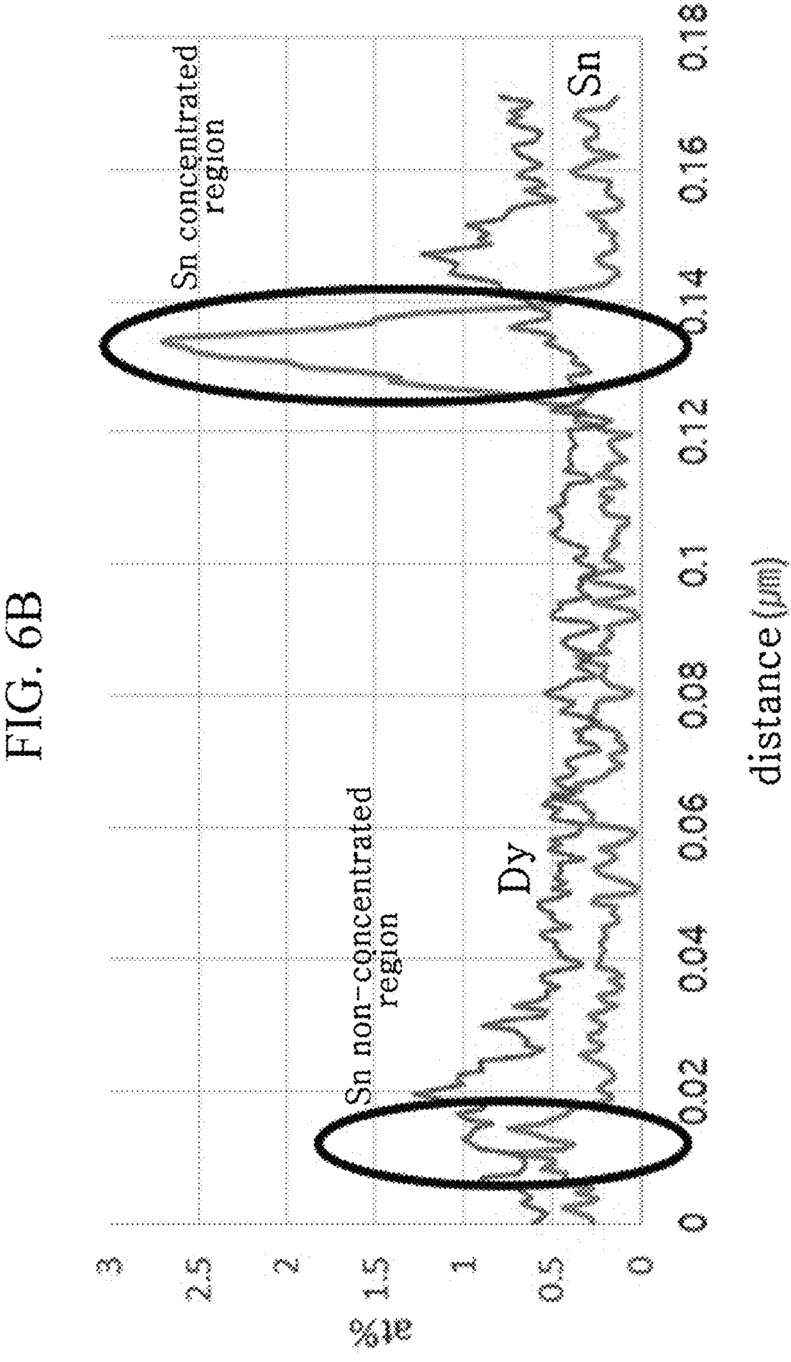
FIG. 6B is an EDS line analysis graph for the dielectric grain of FIG. 6A.

Transmission electron microscope (TEM)-energy dispersion spectroscopy (EDS) line analysis is performed on multilayer ceramic capacitors manufactured in Examples 1 to 3 and Comparative Examples 1 to 5, and the result thereof is shown in FIG. 6A, FIG. 6B, and the following Table 1.

Specifically, cross-sectional samples are obtained through the same method as that in Evaluation 1 using the multilayer ceramic capacitors manufactured in Examples 1 to 3 and Comparative Examples 1 to 5. Subsequently, the active region of the cross-sectional sample is measured using the transmission electron microscope (TEM) so that at least one layer of the dielectric layer 111 is visible. The TEM measures the active portion of the cross-sectional sample under a condition of an acceleration voltage of 200 kV using a Xe-focused ion beam (FIB) in a region of about 300 nm×300 nm within the dielectric layer 111. Subsequently, as shown in FIG. 6A, in the TEM image of the measured cross-sectional sample, the EDS-line analysis is performed on a straight-line section from one outermost point of the dielectric grain to the other outermost point of the dielectric grain across a center of the dielectric grain.

FIG. 6A is the TEM image showing the dielectric grain within the dielectric layer according to Example 1, and FIG. 6B is an EDS line analysis graph for the dielectric grain of FIG. 6A.

Referring to FIG. 6A and FIG. 6B, it may be seen that one dielectric grain includes the core portion and the shell portion and the shell portion is a region from an outermost portion of the dielectric grain to a depth of about 20 nm inside the dielectric grain in the case of Example 1. In addition, it may be seen that in the EDS line analysis graph, the shell portion includes a Sn concentrated region that is a section in which an atom % of tin (Sn) has the highest peak and a Sn non-concentrated region that is a section including tin (Sn) with an atom % lower than that of the Sn concentrated region.

Through the above-described TEM-EDS line analysis, an atom % content ratio (that is, an atomic ratio) of tin (Sn) between the Sn concentrated region A and the Sn non-concentrated region B is obtained to be shown in Table 1 below.

In the following Table 1, a length of Sn concentrated region A is a percentage value compared with a long axis length of the dielectric grain.

TABLE 1

| | Sn atomic ratio between A and B | Length of Sn concentrated region A |
|---|---|---|
| Example 1 | 2.3 | 45% |
| Example 2 | 2.7 | 65% |
| Example 3 | 4.6 | 73% |
| Comparative Example 1 | 0.5 | 17% |
| Comparative Example 2 | 1.2 | 35% |
| Comparative Example 3 | 1.8 | 41% |
| Comparative Example 4 | 6.2 | 88% |
| Comparative Example 5 | 7.8 | 93% |

Evaluation 3: SEM Analysis

Figure 7:
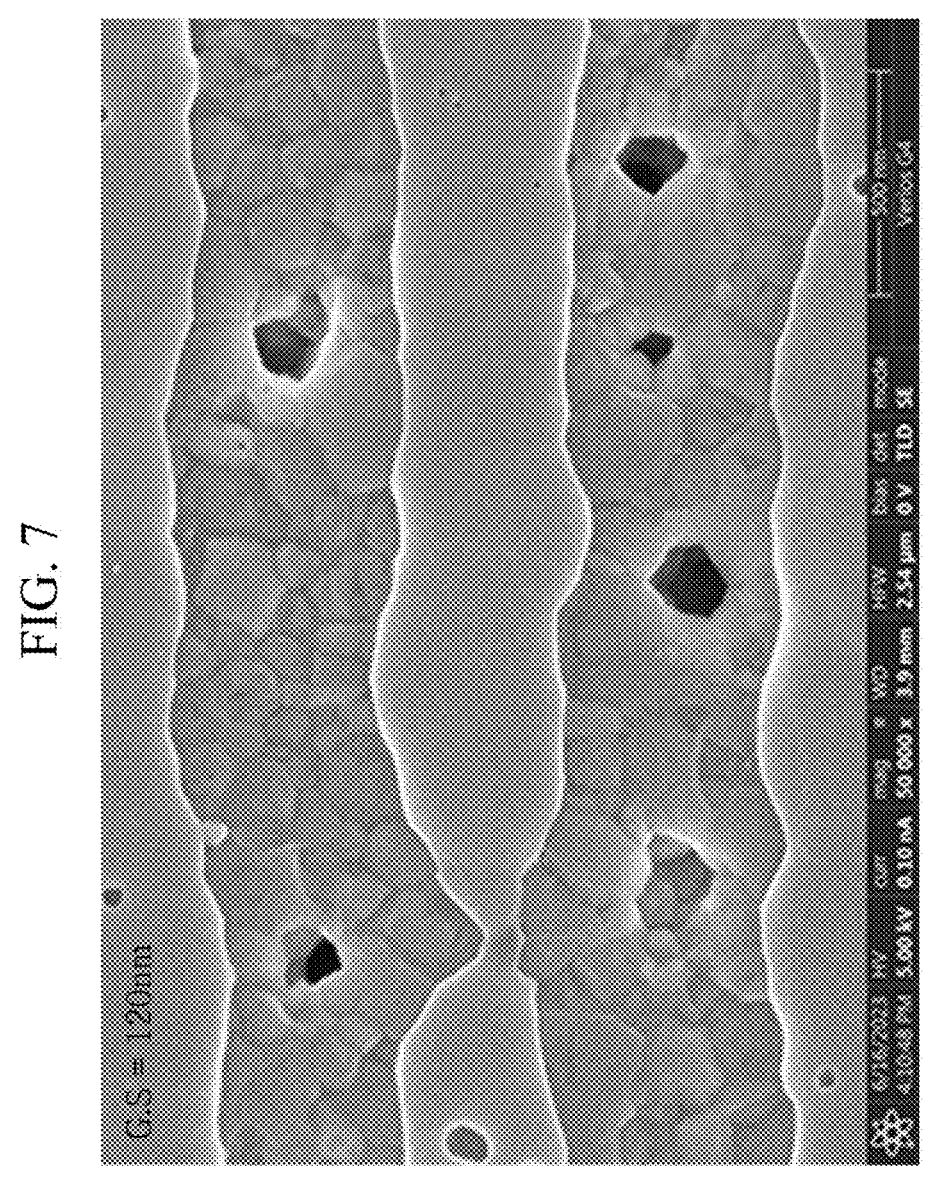
Figure 8:
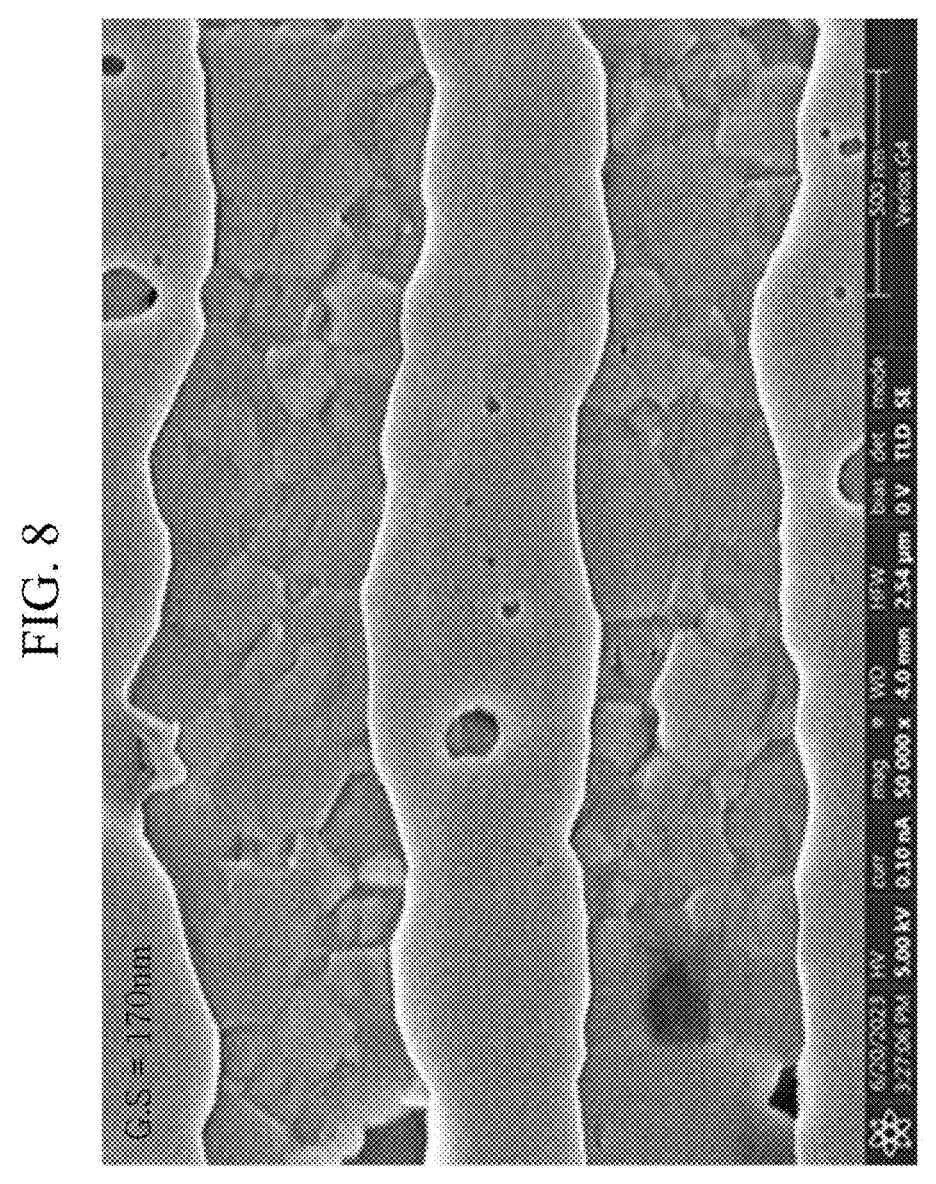

Scanning electron microscope (SEM) analysis is performed on multilayer ceramic capacitors manufactured in Example 1 and Comparative Example 1 so that an average grain size of the dielectric grain is measured, and the result thereof is shown in FIG. 7 and FIG. 8.

Specifically, a cross-sectional sample in which a surface in the W-axis and T-axis directions (a WT surface) of the capacitor body is polished to a ½ point in the L-axis direction after the multilayer ceramic capacitor manufactured in Example 1 and Comparative Example 1 is put into an epoxy mixing solution and the put multilayer ceramic capacitor is cured and the polished capacitor body is maintained within a vacuum atmosphere chamber so that the active portion where the dielectric layer and each of the internal electrode layers cross each other is observed, is obtained. Subsequently, the cross-sectional sample may be measured by the scanning electron microscope (SEM) so that at least two dielectric layers are visible at the active portion of the cross-sectional sample. The SEM is the Verios G4 product from Thermo Fisher Scientific Inc., and the SEM measures the active portion of the cross-sectional sample under a condition of an acceleration voltage of 200 kV using a Xe-focused ion beam (FIB) in a region of about 2.2 μm×2.2 μm where the two dielectric layers are visible. The average grain size of the dielectric grain is obtained by calculating an average value by measuring a diameter of a maximum long axis of at least 100 dielectric grains in the SEM image of the cross-sectional sample.

FIG. 7 is the SEM image of the dielectric layer according to Example 1, and FIG. 8 is the SEM image of the dielectric layer according to Comparative Example 1.

Referring to FIG. 7 and FIG. 8, it may be seen that an average grain size of Example 1 in which a shell portion of the dielectric grain includes the Sn concentrated region and the Sn non-concentrated region and an atomic ratio of tin (Sn) in the Sn concentrated region to tin (Sn) in the Sn non-concentrated region is within a range of 2.0 to 6.0 is 120 nm, but an average grain size of Comparative Example 1 is 170 nm. From this, it may be seen that the grain growth of the dielectric grain according to an embodiment is suppressed so that the reliability in the thin layer is improved.

Evaluation 4: Reliability

Evaluation of an acceleration life is performed on the multilayer ceramic capacitors manufactured in Examples 1 to 3 and Comparative Examples 1 to 5, and the result thereof is shown in the following Table 1, FIG. 9, and FIG. 10.

Specifically, after 40 sample chips are mounted on a reliability substrate, a failure rate (%) at which a chip failure occurs within 10 hours is calculated under conditions of a temperature of 125° C. and a voltage of 6V. In addition, the failure rate is determined as ○ if the failure rate is 5% or less, the failure rate is determined as Δ if the failure rate is greater than 5% to 20% or less, and the failure rate is determined as X if the failure rate is greater than 20%.

TABLE 2

| | Failure rate (%) | Determination |
|---|---|---|
| Example 1 | 5% | ○ |
| Example 2 | 0% | ○ |
| Example 3 | 2.5% | ○ |
| Comparative Example 1 | 32.5% | X |
| Comparative Example 2 | 25% | X |
| Comparative Example 3 | 17.5% | Δ |
| Comparative Example 4 | 10% | Δ |
| Comparative Example 5 | 22.5% | X |

Figure 9:
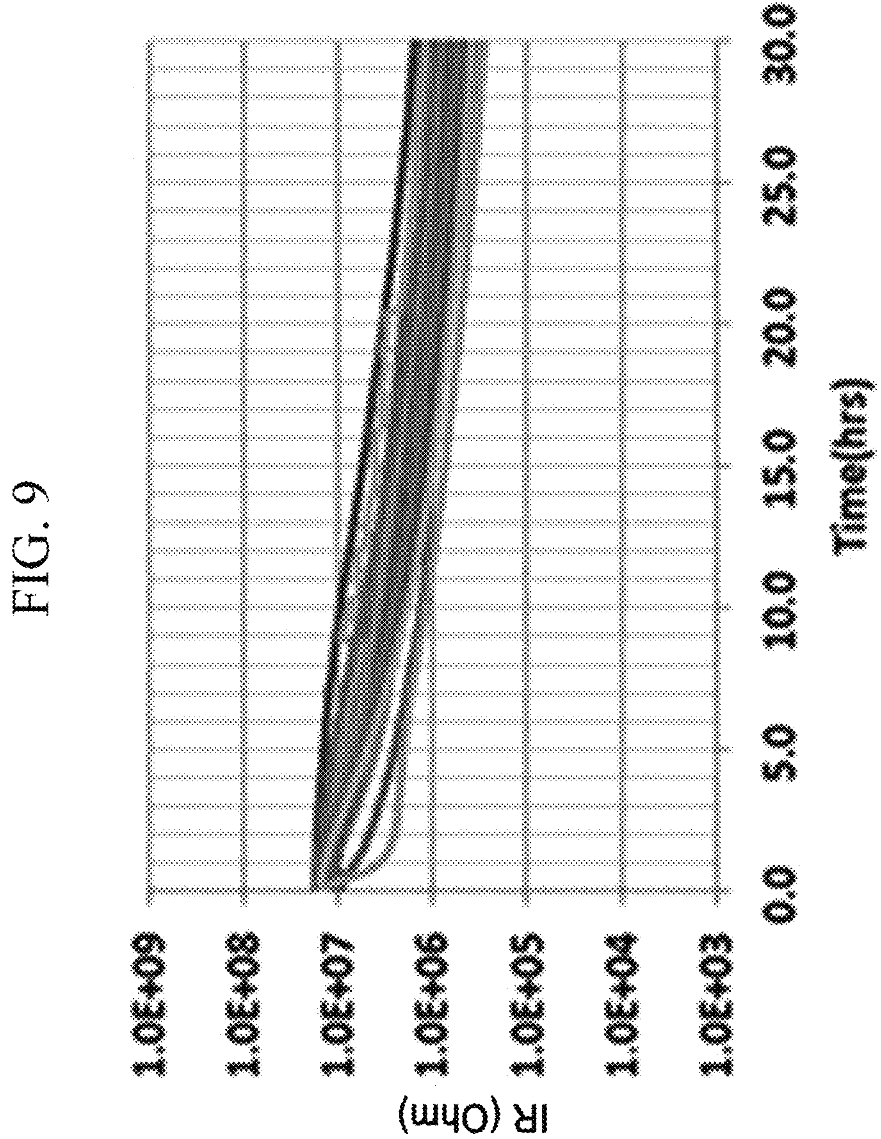
FIG. 9 is a graph evaluating an acceleration life of a multilayer ceramic capacitor according to Example 1.
Figure 10:
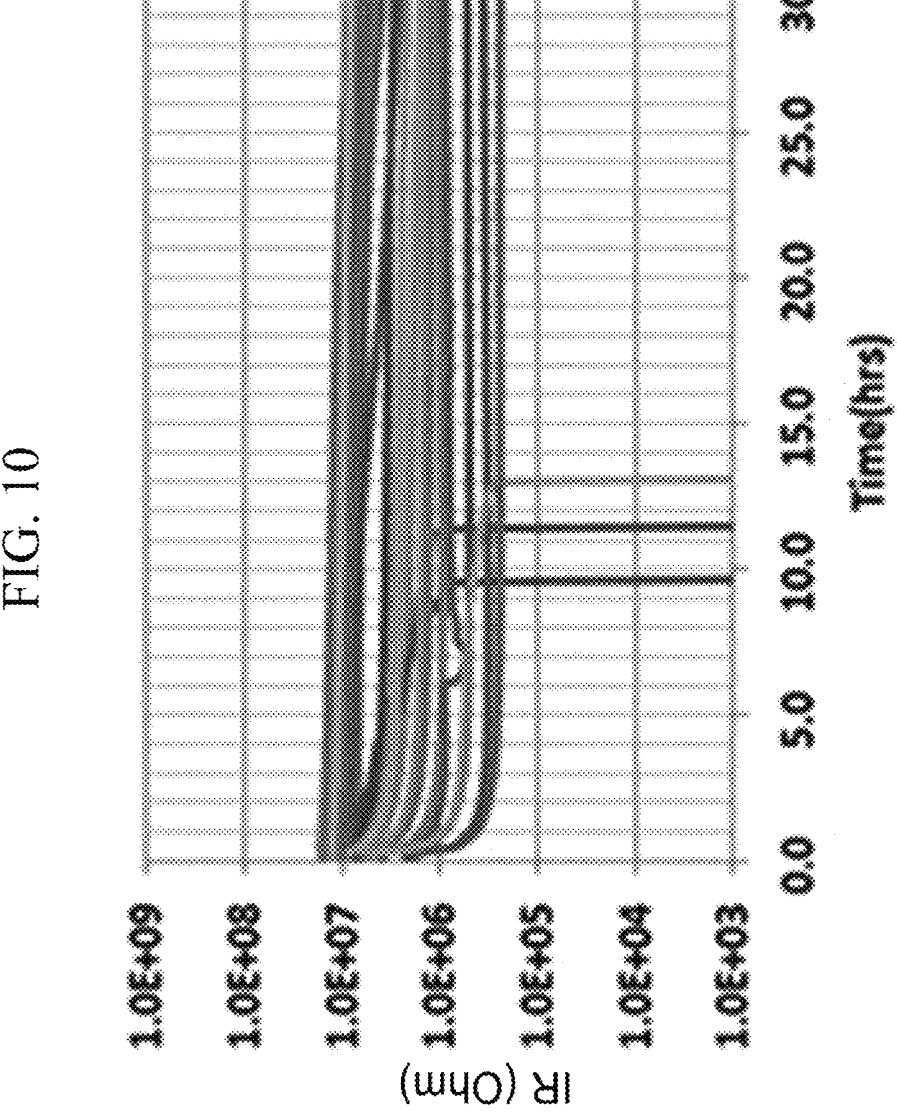
FIG. 10 is a graph evaluating an acceleration life of a multilayer ceramic capacitor according to Comparative Example 1.

FIG. 9 is a graph evaluating the acceleration life of the multilayer ceramic capacitor according to Example 1, and FIG. 10 is a graph evaluating the acceleration life of the multilayer ceramic capacitor according to Comparative Example 1.

Referring to Table 2, FIG. 9, and FIG. 10, it may be seen that Example 1 in which a shell portion of the dielectric grain includes the Sn concentrated region and the Sn non-concentrated region and an atomic ratio of tin (Sn) in the Sn concentrated region to tin (Sn) in the Sn non-concentrated region is within a range of 2.0 to 6.0 has an excellent acceleration life characteristic compared with Comparative Example 1. Therefore, it may be confirmed that the multilayer ceramic capacitor according to the embodiment has excellent reliability in the thin layer.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A multilayer ceramic capacitor, comprising:

a capacitor body that includes a dielectric layer and an internal electrode layer; and an external electrode that is disposed outside the capacitor body, wherein the dielectric layer includes a plurality of dielectric grains, and at least one dielectric grain among the plurality of dielectric grains includes a core portion and a shell portion surrounding at least a portion of the core portion, wherein the shell portion includes a barium titanate-based primary component including barium (Ba) and titanium (Ti) and a secondary component including tin (Sn), wherein the shell portion comprises a Sn concentrated region including tin (Sn) and a Sn non-concentrated region including tin (Sn) at an atom % less than an atom % of tin (Sn) in the Sn concentrated region, wherein an atomic ratio of tin (Sn) included in the Sn concentrated region to tin (Sn) included in the Sn non-concentrated region is 2.0 to 6.0, and wherein the Sn non-concentrated region includes tin (Sn) in an amount of 0.8 atom % or less based on a total amount of elements in the shell portion.

2. The multilayer ceramic capacitor of claim 1, wherein the shell portion is a region from an outermost portion of the at least one dielectric grain to a depth of 15 nm to 25 nm inside the at least one dielectric grain.

3. The multilayer ceramic capacitor of claim 1, wherein, in transmission electron microscope (TEM)-energy dispersion spectroscopy (EDS) line analysis of a straight-line section from one outermost point of the at least one dielectric grain to another outermost point of the at least one dielectric grain across a center of the at least one dielectric grain, the Sn concentrated region has a peak with the highest atom % of tin (Sn).

4. The multilayer ceramic capacitor of claim 1, wherein a length of the Sn concentrated region is 40% to 100% of a long axis length of the at least one dielectric grain.

5. The multilayer ceramic capacitor of claim 1, wherein the plurality of dielectric grains includes 30 to 50 dielectric grains, and the Sn concentrated region is included in 30% to 100% of the 30 to 50 dielectric grains.

6. The multilayer ceramic capacitor of claim 1, wherein an average grain size of the at least one dielectric grain is 80 nm to 160 nm.

7. The multilayer ceramic capacitor of claim 1, wherein the core portion includes the barium titanate-based primary component including barium (Ba) and titanium (Ti).

8. The multilayer ceramic capacitor of claim 1, wherein tin (Sn) is included in an amount of 0.01 parts by mole to 5 parts by mole based on 100 parts by mole of the barium titanate-based primary component within the shell portion.

9. The multilayer ceramic capacitor of claim 1, wherein the secondary component further includes dysprosium (Dy), terbium (Tb), manganese (Mn), vanadium (V), barium (Ba), silicon (Si), aluminum (Al), calcium (Ca), or a combination thereof.

10. The multilayer ceramic capacitor of claim 9, wherein within the shell portion, based on 100 parts by mole of the barium titanate-based primary component, dysprosium (Dy) is included in an amount of 0.01 parts by mole to 5 parts by mole, terbium (Tb) is included in an amount of 0.01 parts by mole to 5 parts by mole, manganese (Mn) is included in an amount of 0.01 parts by mole to 5 parts by mole, vanadium (V) is included in an amount of 0.01 parts by mole to 5 parts by mole, barium (Ba) is included in an amount of 0.01 parts by mole to 5 parts by mole, silicon (Si) is included in an amount of 0.01 parts by mole to 5 parts by mole, aluminum (Al) is included in an amount of 0.01 parts by mole to 5 parts by mole, calcium (Ca) is included in an amount of 0.01 parts by mole to 5 parts by mole, or a combination thereof.

11. The multilayer ceramic capacitor of claim 9, wherein the secondary component further includes dysprosium (Dy).

12. A method of manufacturing a multilayer ceramic capacitor, comprising:

preparing a dielectric slurry by mixing a barium titanate-based primary component powder and a secondary component powder including a tin (Sn)-containing compound;

manufacturing a dielectric green sheet from the dielectric slurry and forming a conductive paste layer on a surface of the dielectric green sheet;

manufacturing a dielectric green sheet laminate by laminating a plurality of the dielectric green sheets on which the conductive paste layer is formed;

manufacturing a capacitor body including a dielectric layer and an internal electrode layer by firing the dielectric green sheet laminate; and forming an external electrode on one surface of the capacitor body, wherein the dielectric layer includes a plurality of dielectric grains, and at least one of the dielectric grains includes a core portion and a shell portion surrounding at least a portion of the core portion, wherein the shell portion includes a barium titanate-based primary component including barium (Ba) and titanium (Ti) and a secondary component including tin (Sn), wherein the shell portion comprises a Sn concentrated region including tin (Sn) and a Sn non-concentrated region including tin (Sn) at an atom % less than an atom % of tin (Sn) in the Sn concentrated region, wherein an atomic ratio of tin (Sn) included in the Sn concentrated region to tin (Sn) included in the Sn non-concentrated region is 2.0 to 6.0, and wherein the Sn non-concentrated region includes tin (Sn) in an amount of 0.8 atom % or less based on a total amount of elements in the shell portion.

13. The method of claim 12, wherein the tin (Sn)-containing compound is mixed in an amount of 0.01 parts by mole to 5 parts by mole based on 100 parts by mole of the barium titanate-based primary component powder.

14. The method of claim 12, wherein the secondary component powder further includes a dysprosium (Dy)-containing compound, a terbium (Tb)-containing compound, a manganese (Mn)-containing compound, a vanadium (V)-containing compound, a barium (Ba)-containing compound, a silicon (Si)-containing compound, an aluminum (Al)-containing compound, a calcium (Ca)-containing compound, or a combination thereof.

15. The method of claim 14, wherein, based on 100 parts by mole of the barium titanate-based primary component powder, the dysprosium (Dy)-containing compound is included in an amount of 0.01 parts by mole to 5 parts by mole, the terbium (Tb)-containing compound is included in an amount of 0.01 parts by mole to 5 parts by mole, the manganese (Mn)-containing compound is included in an amount of 0.01 parts by mole to 5 parts by mole, the vanadium (V)-containing compound is included in an amount of 0.01 parts by mole to 5 parts by mole, the barium (Ba)-containing compound is included in an amount of 0.01 parts by mole to 5 parts by mole, the silicon (Si)-containing compound is included in an amount of 0.01 parts by mole to 5 parts by mole, the aluminum (Al)-containing compound is included in an amount of 0.01 parts by mole to 5 parts by mole, the calcium (Ca)-containing compound is included in an amount of 0.01 parts by mole to 5 parts by mole, or a combination thereof.

16. The method of claim 12, wherein the dielectric green sheet laminate is fired at a firing temperature of more than 1160° C. to 1220° C. or less.

17. The method of claim 12, wherein the dielectric green sheet laminate is fired in an atmosphere having a hydrogen ($H_2$) concentration of 1.0% or less.

18. The method of claim 14, wherein the secondary component powder further includes a dysprosium (Dy)-containing compound.

19. The method of claim 14, wherein the dysprosium (Dy)-containing compound includes dysprosium oxide ($Dy_2O_3$).

* * * * *